United States Patent
Bushida et al.

(10) Patent No.: US 9,902,545 B2
(45) Date of Patent: Feb. 27, 2018

(54) SEAL HEAD AND CONTAINER SEALED WITH USING THE SEAL HEAD

(71) Applicants: SUNTORY BEVERAGE & FOOD LIMITED, Tokyo (JP); SUNTORY HOLDINGS LIMITED, Osaka (JP)

(72) Inventors: Mitsuru Bushida, Tokyo (JP); Daisuke Tanaka, Tokyo (JP); Takashi Kado, Tokyo (JP); Hiroki Yokoyama, Tokyo (JP); Masayuki Kitamasu, Tokyo (JP)

(73) Assignees: SUNTORY BEVERAGE & FOOD LIMITED, Tokyo (JP); SUNTORY HOLDINGS LIMITED, Osaka (JP)

( * ) Notice: Subject to any disclaimer, the term of this patent is extended or adjusted under 35 U.S.C. 154(b) by 75 days.

(21) Appl. No.: 14/902,109

(22) PCT Filed: Jun. 27, 2014

(86) PCT No.: PCT/JP2014/067255
§ 371 (c)(1),
(2) Date: Dec. 30, 2015

(87) PCT Pub. No.: WO2015/002106
PCT Pub. Date: Jan. 8, 2015

(65) Prior Publication Data
US 2016/0368687 A1 Dec. 22, 2016

(30) Foreign Application Priority Data
Jul. 1, 2013 (JP) .................................. 2013-138353

(51) Int. Cl.
B65D 51/10 (2006.01)
B65D 77/10 (2006.01)
(Continued)

(52) U.S. Cl.
CPC .......... B65D 77/2036 (2013.01); B29C 65/18 (2013.01); B29C 66/112 (2013.01);
(Continued)

(58) Field of Classification Search
USPC ....... 220/281, 666, 276, 359, 359.2; 156/69, 156/581, 583.1, 292, 308.4, 379.8, 182;
(Continued)

(56) References Cited

U.S. PATENT DOCUMENTS 3,679,509 A * 7/1972 Fielbert .................... B29C 65/18
156/182
4,158,376 A * 6/1979 Erb ....................... B65D 1/0292
220/666

(Continued)

FOREIGN PATENT DOCUMENTS

JP 61-232108 10/1986
JP 61-244703 10/1986
(Continued)

OTHER PUBLICATIONS

Claim Comparison Chart with Application 14902109 and 14902082.*
(Continued)

*Primary Examiner* — J. Gregory Pickett
*Assistant Examiner* — Gideon Weinerth
(74) *Attorney, Agent, or Firm* — Greenblum & Bernstein, P.L.C.

(57) ABSTRACT

Provided is a portion container whose detaching seal portion can be easily detached by a stress applied from a radial inner side based on an inside pressure of a container body, but can be hardly detached by a stress applied from the outside during distribution. Provided also are a seal head for sealing such container and a container sealed with using such seal head. The seal head includes pressing end portions for
(Continued)

pressing a lid member against a flange of an opening. At least a portion of the pressing end portions is formed as an uneven projecting portion having different curvature radii in its cross sectional contour between a radial inner portion and a radial outer portion of the opening.

2 Claims, 5 Drawing Sheets

(51) Int. Cl.
| | | |
|---|---|---|
| B65D 77/20 | (2006.01) | |
| B65D 1/32 | (2006.01) | |
| B65B 69/00 | (2006.01) | |
| B29C 65/18 | (2006.01) | |
| B29C 65/00 | (2006.01) | |
| B65B 51/14 | (2006.01) | |
| B65B 51/10 | (2006.01) | |
| B65B 7/28 | (2006.01) | |
| B65B 29/02 | (2006.01) | |

(52) U.S. Cl.
CPC ...... *B29C 66/131* (2013.01); *B29C 66/53461* (2013.01); *B29C 66/71* (2013.01); *B29C 66/723* (2013.01); *B29C 66/7392* (2013.01); *B29C 66/81427* (2013.01); *B29C 66/8322* (2013.01); *B65B 7/2878* (2013.01); *B65B 29/022* (2017.08); *B65B 51/10* (2013.01); *B65B 51/14* (2013.01); *B65B 69/005* (2013.01); *B65D 77/2028* (2013.01); *B29C 66/81422* (2013.01); *B65D 2577/2066* (2013.01)

(58) Field of Classification Search
USPC ...... 222/541.4, 95, 96, 107, 541.3; 206/469, 206/484, 631, 219, 604; 99/295, 323.3; 53/133.1, 412, 374.8, 485, 329.2, 329.3, 53/478
See application file for complete search history.

(56) References Cited

U.S. PATENT DOCUMENTS

| | | | | |
|---|---|---|---|---|
| 4,301,923 A * | 11/1981 | Vuorento | ........... | B65D 75/5822 206/484 |
| 4,770,295 A * | 9/1988 | Carveth | ........... | B29C 66/81431 156/273.7 |
| 4,913,307 A * | 4/1990 | Takata | ............ | B29C 65/18 156/69 |
| 4,961,302 A * | 10/1990 | Davis | ............ | B29C 65/18 156/583.1 |
| 4,961,513 A * | 10/1990 | Gossedge | ............ | B29C 65/18 156/69 |
| 4,969,965 A * | 11/1990 | Matty | ............ | B29C 65/18 156/220 |
| 4,978,055 A * | 12/1990 | Miller | ............ | A45C 11/24 150/146 |
| 5,141,594 A * | 8/1992 | Walter | ............ | B29C 65/18 156/581 |
| 5,164,208 A * | 11/1992 | Thomas, Jr. | ........... | B29C 65/18 156/581 |
| 5,546,728 A * | 8/1996 | Dekeyser | ............ | B65D 75/366 222/107 |
| 5,983,607 A | 11/1999 | Mihalov et al. | | |
| 6,540,855 B1 * | 4/2003 | Holmberg | ............ | B29C 65/02 156/292 |
| 6,843,042 B2 * | 1/2005 | Nakabayashi | ........... | B29C 65/02 156/69 |
| 8,608,895 B2 * | 12/2013 | Sato | ............ | B29C 65/18 156/292 |
| 8,784,915 B2 * | 7/2014 | Evers | ............ | A47J 31/407 220/203.08 |
| 8,857,663 B2 * | 10/2014 | Scholvinck | ........ | B65D 77/2036 206/469 |
| 9,023,411 B2 * | 5/2015 | Maatta | ............ | B65D 77/2024 206/497 |
| D757,540 S * | 5/2016 | Bushida | ........................ | D9/434 |
| 2001/0048957 A1 * | 12/2001 | Lazaris | ............. | B65D 85/8043 426/77 |
| 2002/0119221 A1 * | 8/2002 | Matsukura | ............... | A23G 9/28 426/115 |
| 2009/0202684 A1 * | 8/2009 | Willemsen | ............... | B65D 1/32 426/110 |
| 2011/0011273 A1 * | 1/2011 | Evers | ............ | A47J 31/407 99/295 |
| 2011/0111098 A1 * | 5/2011 | Ricotti | ............... | A47J 31/0642 426/89 |
| 2011/0142996 A1 * | 6/2011 | Kruger | ............... | B65D 85/8043 426/80 |
| 2012/0018335 A1 * | 1/2012 | Sanchez | ............ | B65D 75/5866 206/484 |
| 2012/0260806 A1 * | 10/2012 | Rolfes | ............ | A47J 31/38 99/285 |
| 2012/0318801 A1 * | 12/2012 | Wolters | ............... | B65D 77/204 220/359.2 |
| 2014/0263375 A1 * | 9/2014 | Willemsen | ............... | B65D 1/32 220/666 |
| 2015/0245733 A1 * | 9/2015 | Castellani | ........... | A47J 31/0673 426/112 |
| 2015/0266665 A1 * | 9/2015 | Flick | ............... | B65D 81/3294 426/115 |
| 2015/0353272 A1 * | 12/2015 | Mariller | ............... | A47J 31/407 426/112 |
| 2015/0353273 A1 * | 12/2015 | Negus | ............... | B65D 77/2064 220/265 |
| 2015/0375928 A1 * | 12/2015 | Galv | ............... | B65D 85/8043 426/115 |
| 2016/0145026 A1 * | 5/2016 | Bushida | ............... | A47J 31/41 220/281 |
| 2016/0332805 A1 * | 11/2016 | Krupa | ......... | B65D 85/8043 |
| 2016/0368651 A1 * | 12/2016 | Bushida | .......... | B65D 77/2036 |
| 2016/0368685 A1 * | 12/2016 | Bushida | .......... | B01F 13/0022 |
| 2016/0368686 A1 * | 12/2016 | Bushida | .......... | A47J 31/407 |
| 2016/0368687 A1 * | 12/2016 | Bushida | .......... | B65D 77/2028 |
| 2016/0368688 A1 * | 12/2016 | Bushida | .......... | B65D 77/2036 |
| 2016/0368690 A1 * | 12/2016 | Yokoyama | ......... | B65D 77/003 |
| 2017/0247179 A1 * | 8/2017 | Rubinstein | ........ | B65D 85/8043 |

FOREIGN PATENT DOCUMENTS

| | | |
|---|---|---|
| JP | 9-136388 | 5/1997 |
| JP | 2009-102081 | 5/2009 |
| JP | 2012-254823 | 12/2012 |

OTHER PUBLICATIONS

U.S. Appl. No. 14/902,119 to Mitsuru Bushida et al., which was filed Dec. 30, 2015.
U.S. Appl. No. 14/902,088 to Mitsuru Bushida et al., which was filed Dec. 30, 2015.
U.S. Appl. No. 14/902,116 to Mitsuru Bushida et al., which was filed Dec. 30, 2015.
U.S. Appl. No. 14/902,082 to Mitsuru Bushida et al., which was filed Dec. 30, 2015.
U.S. Appl. No. 14/902,077 to Mitsuru Bushida et al., which was filed Dec. 30, 2015.
Search Report issued in PCT/JP2014/067255, dated Sep. 30, 2014.
International Preliminary Report on Patentability for PCT/JP2014/067255, dated Jan. 5, 2016.
English Machine Translation of JPH09-136388.
English Machine Translation of JPS61-244703.
English Machine Translation of JP2009-102081.
English Machine Translation of JPS61-232108.
English Machine Translation of JP2012-254823.

(56) References Cited

OTHER PUBLICATIONS

Search Report issued in European Patent Office (EPO) Patent Application No. 14819439.2, dated Jan. 20, 2017.

* cited by examiner

SEAL HEAD AND CONTAINER SEALED WITH USING THE SEAL HEAD

TECHNICAL FIELD

The present invention relates to a seal head for fusing and bonding a lid member to an opening of a container body holding contents therein and relates also to a container sealed with using such seal head.

BACKGROUND ART

Patent Document 1 identified below exists as an example of background art information relating to this type of seal head and container. The invention disclosed in this Patent Document 1 is characterized by use of a lid member not having an aluminum foil. In sealing a container body with a lid member, there is employed a standard seal head having an annular pressing end portion corresponding to the shape of the opening of the container body.

BACKGROUND ART DOCUMENT

Patent Document

Patent Document 1: Japanese Unexamined Patent Application Publication No. 9-136388 (paragraph [0015], FIG. 3).

SUMMARY

Problem to be Solved by Invention

However, with the sealing arrangement formed by the seal head disclosed in Patent Document 1, needless to say, a lower limit value of the pressure required for lifting up the lid member from the inner side of the container for unsealing is substantially equal to a lower limit value of the pressure for lifting up the lid member from the outer side of the container for unsealing. Thus, it has not been possible to form a more functional sealing arrangement than the convention such as an arrangement that the lid member cannot be unsealed easily by a stress applied from the outer side of the container in the course of distribution such as transportation, storage or the like, but the lid member can be unsealed relatively smoothly by increase of pressure inside the container.

Then, an object of the present invention, in view of the above-described problem provided by the background art illustrated above, is to provide a seal head capable of providing a more functional sealing arrangement that can be unsealed relatively smoothly by an inside pressure of the container, but can be hardly unsealed by a stress applied from the outer side of the container in the course of distribution such as transportation, storage or the like and also to provide a container provided such functional sealing arrangement by the above seal head.

Solution

According to a characterizing feature of a seal head relating to the present invention, the seal head including, at its leading end, a pressing end portion for pressing a lid member against an opening in order to fuse/bond the lid member to the opening of a container body holding contents therein;

wherein at least a portion of the pressing end portion is formed as an uneven projecting portion having different curvature radii in its cross sectional contour between a radial inner portion and a radial outer portion of the opening.

With the seal head having the above-described characterizing feature, in at least a portion of the pressing end portion, curvature radii of the cross sectional contour are made different between a radial inner side and a radial outer side. Thus, at a corresponding portion of a seal groove portion formed in the opening by the pressing end portion of the seal head, there will be formed a uneven groove portion having different curvature radii in its cross sectional contour between a radial inner portion and a radial outer portion of the opening. In this, the applicant obtained as a result of extensive/intensive research a finding that the smaller the curvature radius of cross sectional contour of the seal groove portion, the smaller the stress required for exfoliating the lid member from the opening. Therefore, for example by forming at least a portion of the pressing end portion as an uneven projecting portion having a smaller curvature radius in its cross sectional contour on the radial inner side than the radial outer side of the opening, it has become possible to manufacture a container having a more functional sealing arrangement which can be unsealed relatively smoothly by an inside pressure of the container, but can be hardly unsealed by a stress applied from the outer side of the container in the course of distribution such as transportation, storage or the like. Conversely, also in case the above portion is formed as an uneven projecting portion having a smaller curvature radius in its cross sectional contour on the radial outer side than the radial inner side of the opening, there can be obtained a container having also more functional sealing arrangement which can restrict the risk of inadvertent unsealing by increase of the inside pressure of the container based on e.g. environmental change or the like, but can be unsealed relatively smoothly by a stress for lifting up the lid member from the outer side of the container.

According to a further characterizing of the seal head relating to the present invention, the cross sectional contour of the uneven projecting portion has a shape having a smaller curvature radius on the radial inner side than the radial outer side.

With the above-described arrangement, at least a portion of the seal groove portion formed in the opening by the seal head will be provided as an uneven groove portion having a cross sectional contour whose curvature radius is smaller on the radial inner side than the radial outer side of the opening. Therefore, if the obtained container is used as a portion container whose lid member is to be unsealed from the inner side by increase of the inside pressure based on a deforming operation on the container body, there can be obtained a portion container having high added value that can be relatively smoothly unsealed by the inside pressure of the container, but can be hardly unsealed by a stress applied from the outer side of the container in the course of distribution, such as transportation, storage, or the like.

According to a still further characterizing feature of the seal head relating to the present invention, the pressing end portion constitutes an annular projection endlessly extending along the entire circumference of the opening; and the uneven projecting portion is arranged in a reverse-oriented annular projecting portion with a circumferential portion of the annular projection being projected toward the radial inner side.

With the above-described arrangement, the seal groove portion formed in the opening by the seal head too will be formed as an annular seal groove endlessly extending along the entire circumference of the opening and at a circumferential portion of this annular seal groove too, there is obtained a reverse-oriented annular seal groove projecting toward the radial inner side. When the inside pressure of the container body rises, the leading end oriented towards the radial inner side of this reverse-oriented annular seal groove portion will be the portion where the inside pressure inside the container body will be concentrated most in the annular seal groove portion, thus serving as an exploitation start portion where exploitation of the lid member by the inside pressure starts. Therefore, when the container is used as a portion container, a user can know in advance and with high precision from which part of the opening the contents will be discharged. Consequently, the amount of the contents to remain inside the container in the end can be reduced sufficiently.

According to a characterizing feature of a container relating to the present invention, the container including a container body holding contents therein and a lid member fused and bonded to an opening of the container body by a seal head, wherein at least a portion of a seal groove portion formed in the opening by the fusing/bonding is provided as an uneven groove portion having different curvature radii in its cross sectional contour between a radial inner side and a radial outer side of the opening.

The applicant obtained as a result of extensive/intensive research a finding that the smaller the curvature radius of cross sectional contour of the seal groove portion, the smaller the stress required for exfoliating the lid member from the opening. Therefore, for example by forming at least a portion of the sealing groove portion as an uneven groove portion having a smaller curvature radius in its cross sectional contour on the radial inner side than the radial outer side of the opening, it has become possible to manufacture a container having a more functional sealing arrangement which can be unsealed relatively smoothly by an inside pressure of the container, but can be hardly unsealed by a stress applied from the outer side of the container in the course of distribution such as transportation, storage or the like. Conversely, also in case the above portion is formed as an uneven groove portion having a smaller curvature radius in its cross sectional contour on the radial outer side than the radial inner side of the opening, there can be obtained a container having also more functional sealing arrangement which can restrict the risk of inadvertent unsealing by increase of the inside pressure of the container based on e.g. environmental change or the like, but can be unsealed relatively smoothly by a stress for lifting up the lid member from the outer side of the container.

According to a further characterizing feature of the container relating to the present invention, the cross sectional contour of the uneven groove portion has a shape whose curvature radius is smaller on the radial inner side than the radial outer side.

With the above-described arrangement, if the obtained container is used as a portion container whose lid member is to be unsealed from the inner side by increase of the inside pressure based on a deforming operation on the container body, there can be obtained a portion container having high added value that can be relatively smoothly unsealed by the inside pressure of the container, but can be hardly unsealed by a stress applied from the outer side of the container in the course of distribution, such as transportation, storage, or the like.

According to a still further characterizing feature of the container relating to the present invention, the seal groove portion constitutes an annular seal groove portion endlessly extending along the entire circumference of the opening; and the uneven groove portion is arranged in a reverse-oriented annular groove portion with a circumferential portion of the annular groove being projected toward the radial inner side.

With the above-described arrangement, when the inside pressure of the container body rises, the leading end oriented towards the radial inner side of this reverse-oriented annular seal groove portion will be the portion where the inside pressure inside the container body will be concentrated most in the annular seal groove portion, thus serving as an exploitation start portion where exploitation of the lid member by the inside pressure starts. Therefore, when the container is used as a portion container, a user can know in advance and with high precision from which part of the opening the contents will be discharged. Consequently, the amount of the contents to remain inside the container in the end can be reduced sufficiently.

EMBODIMENTS

Next, embodiments of the present invention will be described with reference to the accompanying drawings.
(General Configuration of Portion Container)

Figure 1:
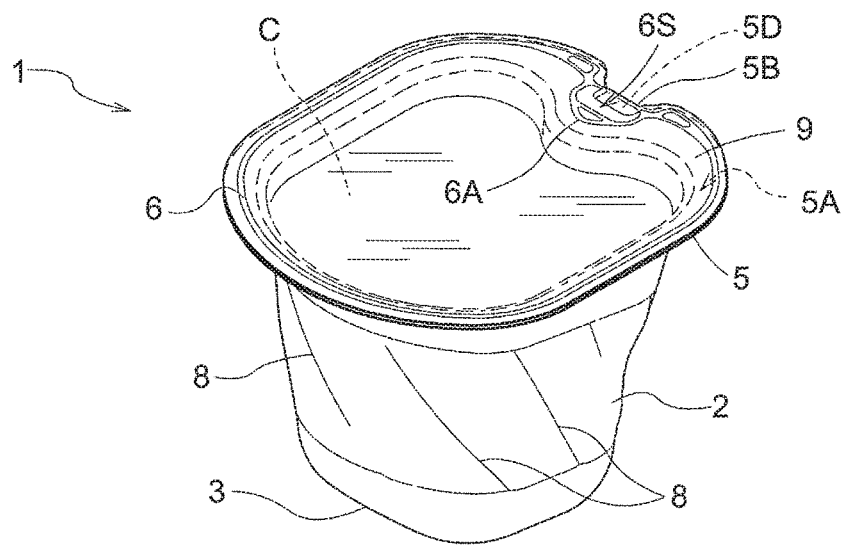
Fig. 1 is a perspective view showing appearance of a container.

FIG. 1 shows an example of a portion container 1 manufactured by a seal head relating to the present invention. This portion container 1 shown in FIG. 1 includes a container body 2 formed of resin and holding an amount of contents C in form of e.g. liquid therein and having a bottom and a lid member 9 formed of resin and configured to close an opening of the container body 2 in a sealing manner. At least a portion of the container body 2 is configured to be easily deformable by an external force.

The container body 2 and the lid member 9 are originally sealed with each other via an annular seal portion 6 formed annularly along a flanged face 5A of a flange 5 extending radially outwards from the opening of the container body 2. In response to a pressing pressure applied to e.g. a bottom face 3 of the container body 2, a portion of the container body 2 will be deformed in such a manner to reduce the inside volume of this container body 2. Then, when the pressure inside the container body 2 rises to reach a critical value, exfoliation (an example of "detachment") of the lid member 9 from the flanged face 5A occurs at a portion of the annular seal portion 6, thus effecting unsealing of the container.

Incidentally, even when some air is present in the container body 2 together with the contents C, if the unsealing is effected under a state of reverse-orienting the portion container 1 with the lid member 9 disposed downwards, the contents C, rather than the air, will be discharged first.

At a specified position in the annular seal portion 6, there is provided a detaching seal portion 6S, 6R which can be detached more easily by increase of the inside pressure of the container body 2 than the remaining portion of the annular seal portion 6. Therefore, the above ensures that the position of the lid member 9 to be detached from the flanged face 5A with the increased inside pressure of the container body 2 will always be present at the position of this detaching seal portion 6S, so that the user can readily anticipate the advancing or discharging direction of the discharged contents C.

Figure 4:
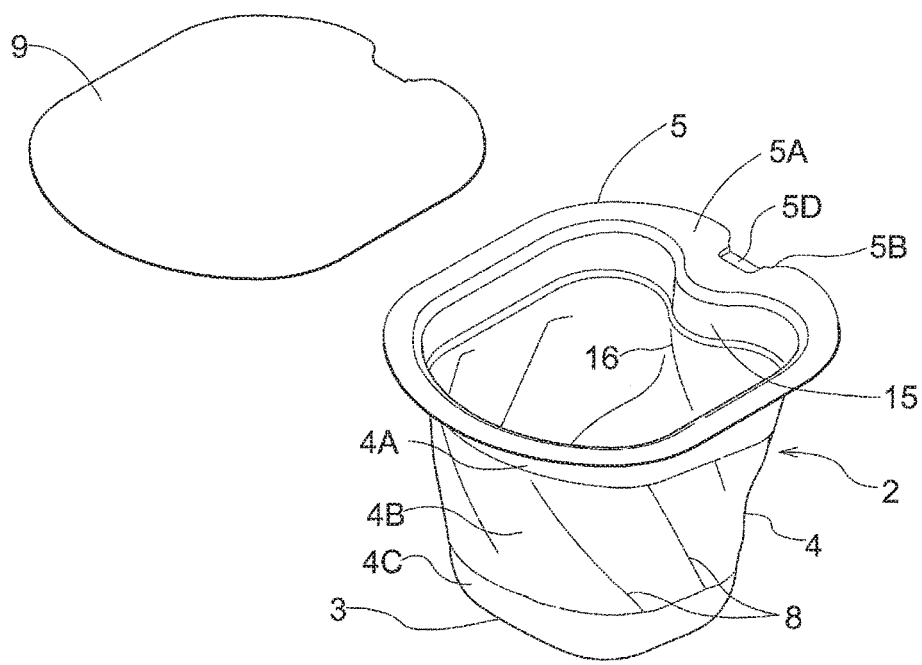
Fig. 4 is a section view showing a container body and a lid member of the container.

As shown in FIG. 1 and FIG. 4, at a portion of the flange 5 of the container body 2, there is formed an engaged sunk portion 5B sunk to the radially inner side (this engaged sunk portion 5B will appear as a "dent" in the outer shape of the flange 5 as seen in its plane view). And, at an area of the flanged face 5A corresponding to the engaged sunk portion 5B, there is formed an outflow groove 5D which is sunk toward the bottom face 3 and which is formed generally rectangular in the plane view (this outflow groove 5D will appear as a dent in the outer shape of the flange 5 as seen its front view or side view). This outflow groove 5D constitutes an outflow channel through which the contents C will flow upon exfoliation of the detaching seal portion 6S. The detaching seal portion 6S is disposed at an angular position corresponding to these members, i.e. the engaged sunk portion 5B and the outflow groove 5D as seen in the plane view.

(Configuration of Dilution Bottle)

Figure 2:
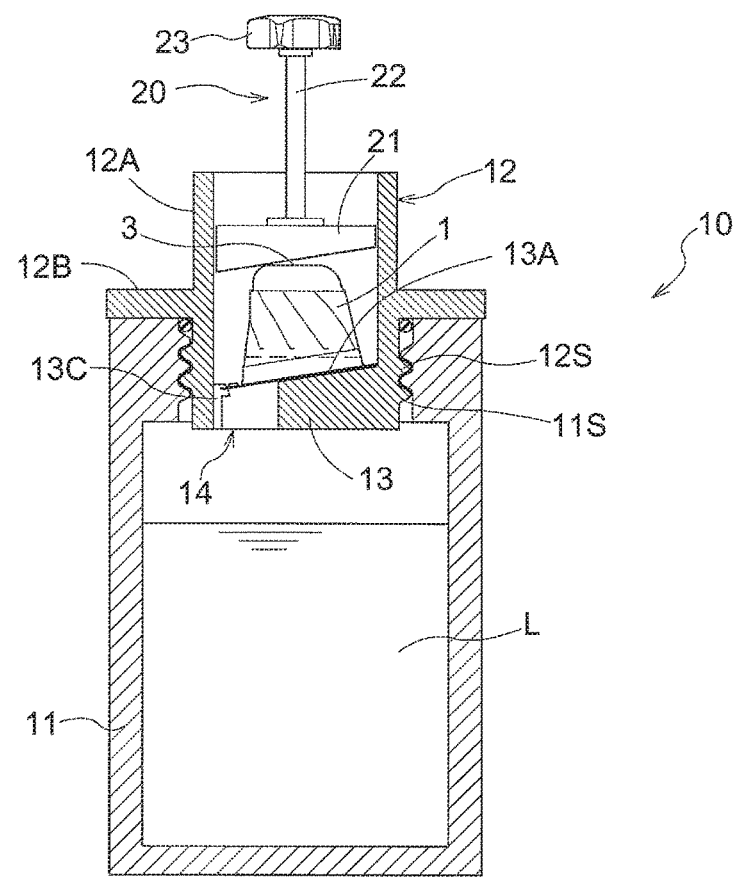
Fig. 2 is a section view showing the container as being set with a dilution bottle.
Figure 3:
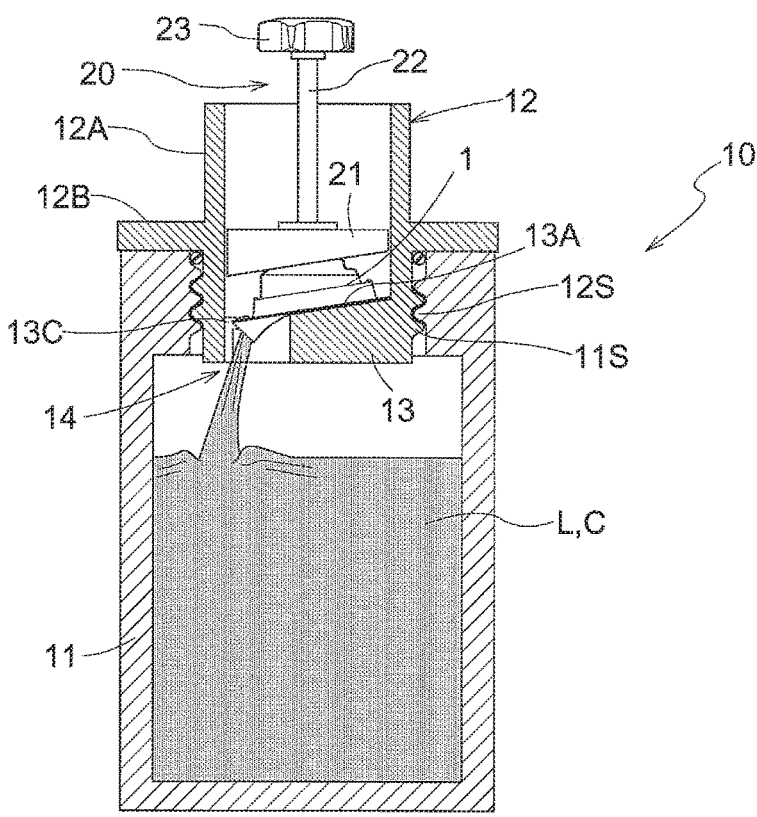
Fig. 3 is a section view showing the dilution bottle and the container which has been deformed and unsealed.

FIG. 2 shows an example of a bottle 10 that allows easy mixing of the contents C discharged from the portion container 1 with certain other liquid L or the like when used in combination with this portion container 1 and shows also the portion container 1 as being set to the bottle 10.

The bottle 10 shown in FIG. 2 includes a bottomed bottle body 11 having a relatively large capacity as compared with the portion container 1, an unsealing support member 12 provided at an upper portion of the bottle body 11, and a pressure applying member 20 supported to the inner face of the unsealing support member 12 to be vertically movable relative thereto.

The unsealing support member 12 includes a cylindrical portion 12A having an interior communicated to the interior of the bottle body 11 and a disc-shaped flange portion 12B extending radially outwards from a vertically intermediate position in the cylindrical portion 12A. The unsealing support member 12 is threaded to a female threaded portion 11S formed in an inner face of the opening of the bottle body 11 via a male thread 12S formed in the outer circumference of cylindrical portion 12A downwardly of the flange portion 12B.

Inside the cylindrical portion 12A, there is provided a container support portion 13, 13C for supporting the portion container 1 with the lid member 9 being oriented downwards.

The container support portion 13 includes a sloped face 13A which has a profile progressively decreased toward the opening 14 so as to establish communication between an upper inner space of the cylindrical portion 12A and the inside space of the bottle body 11.

The pressure applying member 20 includes a piston body 21 provided to be slidable relative to the inner face of the cylindrical portion 12A of the unsealing support portion 12, a bar-like support shaft 22 extending upwards from the upper face of the piston body 21, and a generally disc-like operational piece 23 attached to the upper end of the support shaft 22.

Figure 5:
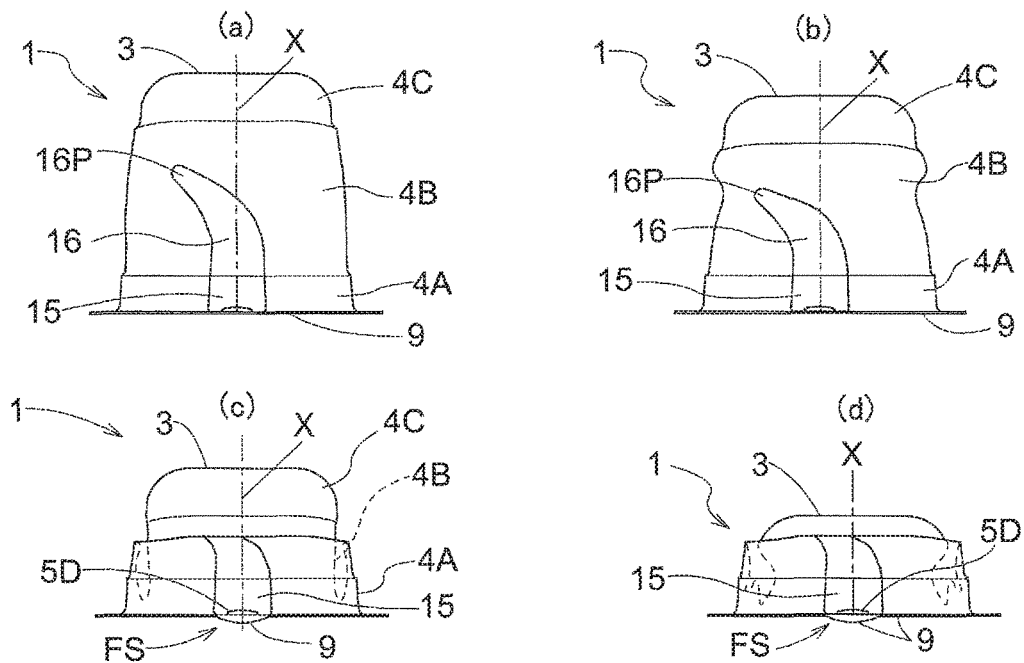
Fig. 5 is a plane view showing in (a) - (d) a deforming step of the container body.

When the user progressively presses down the pressure applying member 20 via the operational piece 23 with the portion container 1 being placed on the sloped face 13A of the container support portion 13, as illustrated in FIG. 5, the container body 2 is deformed to cause the inside pressure of this container body 2 to rise to reach a critical value, so that the lid member 9 will tend to detach from the flanged face 5A in the vicinity of the detaching seal portion 6S. However, as the detaching seal portion 6S is placed under the state of facing the opening 14 from the above, the lid member 9 will be detached freely without being interfered by e.g. the sloped face 13A, so the unsealing operation can proceed smoothly.

When the pressure applying member 20 is pressed down farther, as illustrated in FIG. 5 (d), there will occur vertically reducing deformation mainly in the side wall portion 4 of the container body 2, whereby most of the contents C will be discharged to the inside of the bottle body 11.

(Detailed Configuration of Side Wall Portion)

As shown in FIG. 4, the side wall portion 4 of the container body 2 comprises a cylindrical body whose diameter is progressively reduced toward the bottom face 3, and the side wall portion 4 includes a base end portion 4A extending from the back face of the flange 5 towards the bottom face 3, a leading end portion 4C extending from the bottom face 3 towards the flange 5, and an intermediate portion 4B interconnecting these base end portion 4A and leading end portion 4C.

The intermediate portion 4B is formed to obtain a smaller wall face thickness than the base end portion 4A and the leading end portion 4C, so that this intermediate portion 4B can be deformed more easily by an external force than the base end portion 4A and the leading end portion 4C. Incidentally, the arrangement for rendering the intermediate portion 4B more easily deformable than the two portions 4A, 4C can be provided by any other technique than the above, such as forming ribs only in the base end portion 4A and the leading end portion 4C after forming, or forming a folding line in the intermediate portion 4C alone.

Therefore, as the pressure applying member 20 is pressed down gradually via the operational piece 23 as described above, the deformation of the container body 2 will proceed with mainly the intermediate portion 4B having the smaller thickness in the side wall portion 4 collapsing.

FIG. 5 shows four states in sequence according to the sequence of deformation, from the initial state (a) in which the side wall portion 4 is not yet subject to any deformation to the state (d) in which the side wall portion 4 has been deformed sufficiently until most of the intermediate portion 4B advances into between the base end portion 4A and the leading end portion 4C.

In the instant embodiment, as illustrated in FIG. 5 (a) in particular, there are provided small radially extending steps adjacent the boundary between the base end portion 4A and the intermediate portion 4B and adjacent the boundary between the intermediate portion 4B and the leading end portion 4C. At the positions of these steps, the intermediate portion 4B has a smaller diameter than the base end portion 4A and the leading end portion 4C has a smaller diameter than the intermediate portion 4B, respectively.

Therefore, when the vertical reduction deformation occurs with the collapsing deformation of the side wall portion 4, as illustrated in FIG. 5 (d), deformation proceeds with a portion of the intermediate portion 4B entering the radial inner side of the base end portion 4A and with the leading end portion 4C entering the radial inner side of the intermediate portion 4B, respectively.

Further, in the instant embodiment, as illustrated in FIG. 5 (a) etc., at a circumferential portion of the side wall portion 4, there is formed a sloped sunk portion 16 which has a progressively reduced width as it is displaced from the end of the intermediate portion 4B (the lower end of the intermediate portion 4B in FIG. 5) generally toward the bottom face 3 to one left or right side (the left side in FIG. 5) in the circumferential direction when the container body 2 assumes the posture of the lid member 9 being oriented downwards and which includes an upper end portion 16P adjacent the boundary between the intermediate portion 4B and the leading end portion 4C.

As shown in FIG. 4 and FIG. 5, at a position in the base end portion 4A on the radially inner side of the engaged sunk portion 5B, there is provided a base end sunk portion 15 which extends linearly along an axis X from the back face of the flanged face 5A toward the bottom face 3. This base end sunk portion 15 is sunk in the form of an arc projecting radially inwards as seen in the plane view, and the sloped sunk portion 16 extends continuously from an end portion of the base end sunk portion 15 (the upper end of the base end sunk portion 15 in FIG. 5) toward the bottom face 3.

Then, when a vertical stress is applied to the side wall portion 4 by e.g. the pressure applying member 20, the stress or distortion will be concentrated in the vicinity of the upper end 16P of the sloped sunk portion 16, so that the collapsing deformation of the side wall portion 4 will begin from the vicinity of this upper end 16P, as illustrated in FIG. 5 (b).

The second view (b) in FIG. 5 illustrates a situation when the collapsing deformation of the side wall portion 4 has started at the portion of the sloped sunk portion 16 corresponding to the upper end 16P vicinity. When further vertical stress is applied thereto, a portion of the intermediate portion 4B will be bent radially inwards, thus realizing the state illustrated in the third view (c) in FIG. 5 in which it has advanced to the radially inner side of the base end portion 4A.

Next, when further vertical stress is applied from the state illustrated in FIG. 5 (c), the bent portion of the intermediate portion 4B projecting downwards on the radial inner side of the base end portion 4A will move within the intermediate portion 4B gradually towards the bottom face 3 and approaching the flange 5 at the same time, thus realizing the state illustrated in the fourth view (d) in FIG. 5 in which the side wall portion 4 has been deformed sufficiently until most of the intermediate portion 4B has advanced into between the base end portion 4A and the leading end portion 4C.

Figure 7:
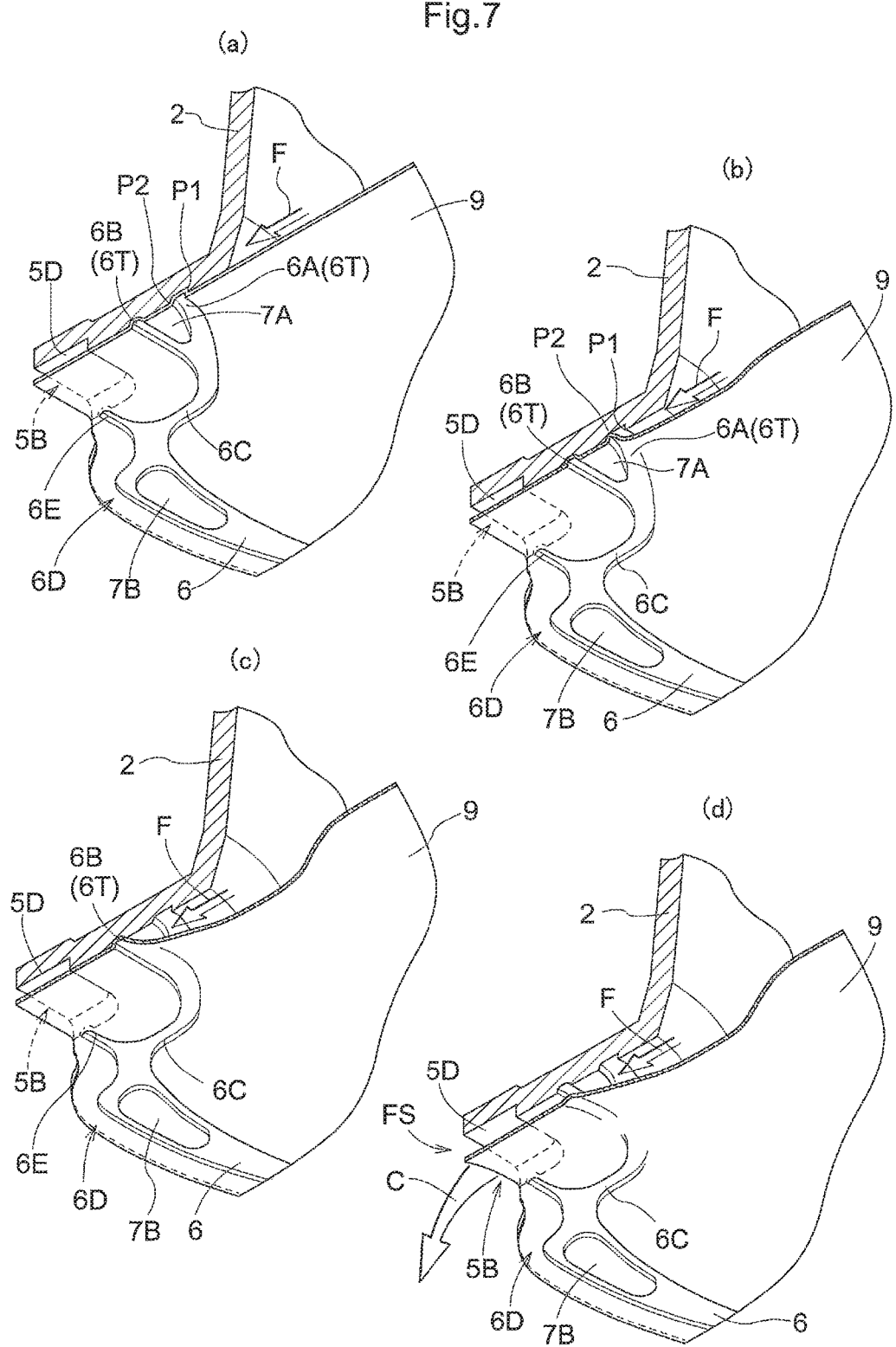
Fig. 7 is a perspective view illustrating in (a) - (d) a detaching step of a detaching seal portion.

In the course of the above, under the state illustrated in the third view (c) in FIG. 5 at the latest, the lid member 9 will be exfoliated from the flange 5A only at the detaching seal portion 6S as illustrated in FIG. 7 (d), so that unsealing is effected to allow start of discharge of the contents C from between the outflow groove 5D and the lid member 9. In this, between the outflow groove 5D and the back face of the exfoliated lid member 9, as shown in FIG. 5 and FIG. 7, there will be formed a cylindrical outflow guiding space FS extending in the radial direction, so the contents C will be discharged in a stable manner as being guided by this cylindrical outflow guiding space.

Incidentally, in the intermediate portion 4B of the side wall portion 4, in order to prevent deformation by a shock during transportation for instance, there are formed a plurality of narrow line-like recesses 8 in the form of ribs arranged equidistantly and inclined along the same direction along the axis X, for the purpose of obtaining higher strength at thin-walled portion.

(Detailed Configuration of Annular Seal Portion)

Figure 6:
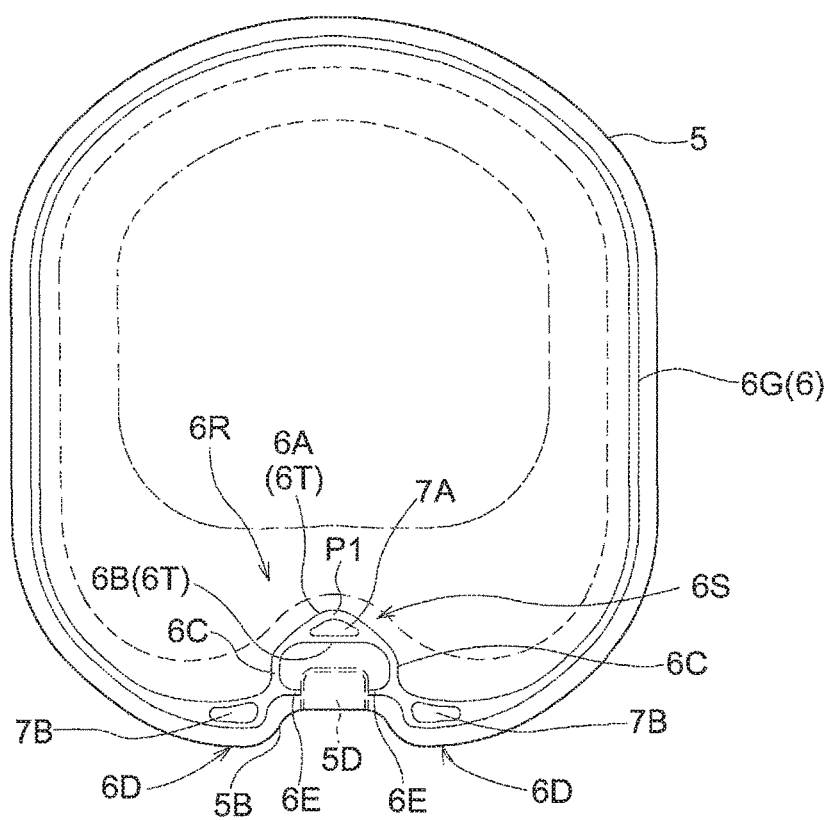
Fig. 6 is a plane view showing an annular seal portion.

As shown in FIG. 1 and FIG. 6, the annular seal portion 6 sealing between the container body 2 and the lid member 9 is configured such that rather than this seal portion 6 being face-fused and bonded across the entire width of the flanged face 5A over the entire circumference, the portion 6 is fused and bonded in the form of a line occupying only a portion of the width of the flanged face 5A.

More specifically, the annular seal portion 6, as shown in FIG. 6, includes a triangular seal portion 6T provided in the form of a triangle including a triangular first insular portion 7A at a position on the radial inner side of the engaged sunk portion 5B, an ordinary seal portion 6G formed longest in the form of a ring or a line projecting toward the radial outer side at the portion of the flanged face 5A excluding the engaged sunk portion 5B, a pair of left and right non-detaching seal portions 6D provided from the opposed ends of the ordinary seal portion 6G in such a manner to include a second insular portion 7B with an offset toward the engaged sunk portion 5B, and a pair of left and right connecting annular seal portions 6C connecting the triangular seal portion 6T and the non-detaching seal portions 6D.

Incidentally, in this detailed description, the term "insular portion" refers to a portion where the lid member 9 is not fused and bonded intentionally and partially to the flanged face 5A, but is left in the form of an island inside the bonded portion present in its surrounding.

Further, the annular seal portion 6 includes a pair of left and right auxiliary non-detaching seal portions 6E extending from the vicinity of the boundary between the non-detaching seal portions 6D and the connecting seal portion 6C to be disposed to face each other across the outflow groove 5D therebetween.

The triangular portion 6T only one of which is provided and the non-detaching seal portions 6D two of which are provided exhibit a ring-shape including the first insular portion 7A and the second insular portion 7B therein, such that a secondary ring-like portion is included in a portion of the overall primary ring-like portion formed by the annular seal portion. Here, the "primary ring-like portion" refers to a single large seal portion extending to surround the entire opening of the container body 2, whereas the "secondary ring-like portion" refers to a small seal portion extending to surround the first insular portion 7A and the second insular portion 7B.

In the instant embodiment, the triangular seal portion 6T mainly constitutes the detaching seal portion 6S which can be detached more easily than the remaining portion of the annular seal portion 6 by increase of the inside pressure of the container body 2.

The triangular seal portion 6T is provided along the region corresponding to the radial inner side of the engaged sunk portion 5B in the flanged face 5A and exhibits as a whole a shape of an isosceles triangle projecting toward the radial inner side of the annular seal portion 6 in left-right symmetry.

In the triangular seal portion 6T, the two sides thereof located on the radial inner side of the above isosceles triangle, provide a reverse-oriented annular seal portion 6A which is curved to project toward the radial inner side of the opening in the plane view, conversely from the ordinary seal portion 6G.

On the other hand, the one side corresponding to the base on the radial outer side of the isosceles triangle forms an auxiliary detaching seal portion 6B which extends linearly to interconnect the opposed ends of the reverse-oriented seal portion 6A.

As a result of its geometric feature of being curved to project towards the radial inner side, in the event of increase of the inside pressure associated with deformation of the container body 2, a radially inwardly oriented leading end R1 of the reverse-oriented annular seal portion 6A (see FIG. 6 and FIG. 7) will be the portion where the inside pressure of the container body 2 is concentrated most in the annular seal portion 6, so that the reverse-oriented annular seal portion 6A serves as an exfoliation start portion where exfoliation of the lid member 9 starts with this inside pressure.

FIG. 7 shows four views arranged in accordance with progress of exfoliation (detachment), from the initial state (a) when exfoliation of the lid member 9 or detachment of the annular seal portion 6 is not yet started to the state (d) when the exfoliation of the lid member 9 at the detaching seal portion 6S by the inside pressure F of the container body 2 has been completed.

The second view (b) in FIG. 7 illustrates a state when exfoliation of the lid member 9 has been started at the leading end P1 of the reverse-oriented annular seal portion 6A. The third view (c) in FIG. 7 illustrates a state when the exfoliation of the lid portion 9 has progressed over the entirety of the reverse-oriented annular seal portion 6A, but no exfoliation has occurred yet at the linear-shaped auxiliary detaching seal portion 6B.

As shown in the third view (c), after exfoliation of the reverse-oriented annular seal portion 6A, the inside pressure F of the container body 2 will be concentrated most at the auxiliary detaching seal portion 6B. So, exfoliation of the lid member 9 will proceed at this auxiliary detaching seal portion 6B with the inside pressure F.

As the result of progress of exfoliation of the lid member 9 at the auxiliary detaching seal portion 6B, as illustrated in the fourth view (d), when at least a portion of the auxiliary detaching seal portion 6B has been detached, partial detachment of the annular seal portion 6 will be accomplished, whereby discharge of the contents C from the container body 2 will start.

Finally, as illustrated in the fourth view (d) in FIG. 7, when the exfoliation of the lid member 9 has occurred along the entire length of the linear-shaped auxiliary detaching seal portion 6B, in other words, when the exfoliation/unsealing has occurred only at the region of the triangular seal portion 6T constituting generally the detaching seal portion 6S, detachment of the annular seal portion 6 will be completed. Yet, a necessary outflow channel will be maintained to allow discharging of the contents C entirely at an appropriate rate.

Figure 8:
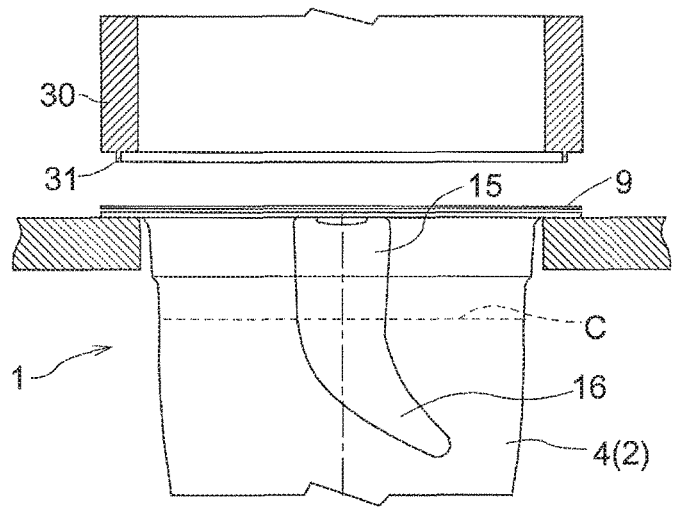
Fig. 8 is a section view illustrating a sealing step of an annular seal portion by a seal head.

Incidentally, as illustrated in FIG. 8, the annular seal portion 6 is sealed by pressing the lid member 9 against the flanged face 5A of the container body 2 by a predetermined period (e.g. from 1 to a few seconds) be means of a hot seal head 30 having an annular projection 31 (an example of a "pressing end portion) having a shape corresponding to the shape of this annular seal portion 6 at its lower end.

Therefore, of a plurality of layers made of laminate films constituting the lid member 9, the lowermost layer contacting the flanged face 5A includes a heat seal layer (not shown) containing polyolefin-based resin having a function of being temporarily softened with application of heat and pressure from the seal head 30, thus heat-fused and bonded to the flanged face 5A.

By the pressing of the seal head 30, the lid member 9 will be fusedly bonded to the flanged face 5A with the heat seal layer at the portion corresponding to the annular projection 31 provided at the lower end of the seal bar 30. At the same time, a groove-like sunk portion corresponding to the annular projection 31 will be formed in the flanged face 5A.

As a result of research effort made in connection with the present invention, there was obtained a finding that in the cross sectional shape of the groove of the annular seal portion 6, the edge portions of the groove (the portions slightly raised on the opposed sides of the groove) show strongest bonding force. It was therefore found that in order to obtain a stronger bonding force, increase of the number of grooves is more effective than simply increasing the bonding area or increasing the width size of the groove to be formed by the seal head 30.

Figure 9:
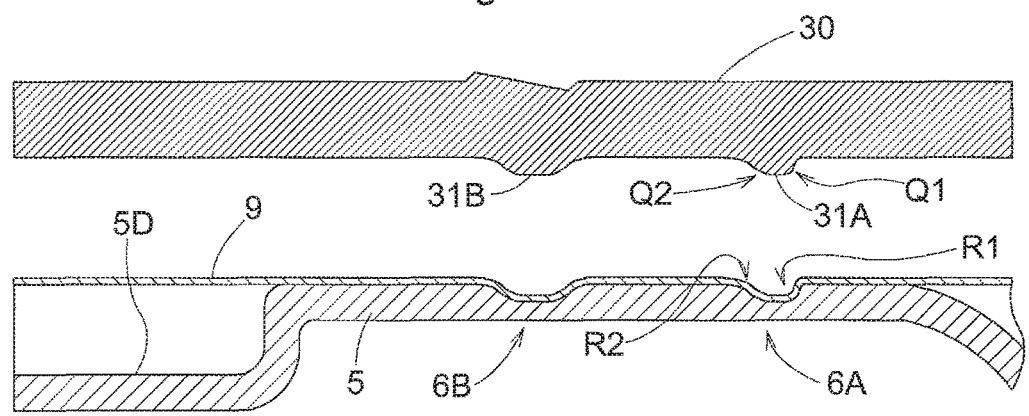
Fig. 9 is a section view showing the detaching seal portion and an annular projection of the seal head.

Further, although the cross sectional shape of the annular projection 31 is a significant factor that controls the bonding force of the annular seal portion 6, as illustrated in FIG. 9, respecting the annular projection 31 provided to form most of the annular seal portion 6 including the ordinary seal portion 6G, this projection 31 is provided with a shape having a same shape at its radially inner portion and its radially outer portion, that is, a left/right symmetric cross sectional shape.

The significant characterizing feature of the present invention resides in that as for the annular projection 31A provided to form the reverse-oriented annular seal portion 6A, its radially outer side portion (Q2 in FIG. 9) has a curvature radius substantially equal to that of the ordinary annular projection 31B (even projecting portion) provided to form the other auxiliary detaching seal portion 6B, but its radially inner side portion (Q1 in FIG. 9) is provided with a smaller curvature radius than the radially outer side portion (Q2), thus provided with a special cross sectional shape non-right/left symmetric (uneven projecting portion).

Therefore, as shown in the lower portion in FIG. 9, the cross section of the reverse-oriented annular seal portion 6A sealed by the annular projection 31A has a special shape with a radially inner portion (R1) being sunk to face the bottom face 3 at a more acute angle as compared with a radially outer portion (R2). That is, the groove of the reverse-oriented annular seal portion 6A formed by the seal head 30 constitutes an "uneven sealing force groove" where resistance against a detaching force applied from the radial inner side is distinctly smaller than resistance against a detaching force applied from the radial outer side. As a result, at the radially inner portion of the reverse-oriented annular seal portion 6A, exfoliation will occur with a lower inside pressure F as compared with the remaining portion of the annular seal portion 6, so that the above-described leading end P1 (radial inner side end portion) can function as the exfoliation start point reliably.

On the other hand, the portion (R2) located on the radially outer side of the reverse-oriented annular seal portion 6A has the standard cross sectional shape sunk to be oriented toward the bottom face 3 at the substantially equal angle to that of e.g. the auxiliary detaching seal portion 6B. Thus, inconvenience of inadvertent unsealing of the lid member 9 by an external force which may be applied in the course of transportation/distribution is prevented.

Next, the pair of left and right non-detaching seal portions 6D, as shown in FIG. 7, are disposed on the circumferentially outer sides relative to the outflow groove 5D, with two annular seal portions extending in the circumferential direction to surround the second insular portions 7B which respectively exhibit a streamline shape as seen in the plane view. In this way, in each detaching seal portion 6D, the two annular seal portions surrounding the second insular portion 7B are provided. This arrangement serves to double the number of the edge portions of the groove described above. As a result, at this portion, the lid member 9 is bonded with a bonding force which far exceeds the bonding force provided by the ordinary seal portion 6G comprised of a single annular seal portion. Further, the portion of the annular projection 31A sealing the non-detaching seal portion 6D has the ordinary left/right symmetric cross sectional shape having the curvature radius substantially equal to that of e.g. the auxiliary detaching seal portion 6B. Consequently, even when the rate of increase of the inside pressure of the container body 2 exceeds a generally expected range, the possibility of the detaching starting at the detaching seal portion 6S extending inadvertently to the non-detaching seal portion 6D is small.

The triangular seal portion 6T and each non-detaching seal portion 6D are connected to each other via the one of the left and right pair of connecting annular seal portions 6C. From the vicinity of the boundary between the non-detaching seal portions 6D and the connecting annular seal portions 6C, the pair of left and right auxiliary non-detaching seal portions 6E extend to the position immediately before the outflow groove 5D in such a manner to be disposed to face each other across this outflow groove 5D therebetween. Respecting the connecting annular seal portion 6C and the auxiliary non-detaching seal portion 6E, these seal portions 6C, 6E too have the ordinary left-right symmetric cross sectional shape with the curvature radius substantially equal to that of e.g. the auxiliary detaching seal portion 6B.

As illustrated in the last view (d) in FIG. 7, the pair of left and right auxiliary non-detaching seal portions 6E too will not be detached like the non-detaching seal portions 6D, and the auxiliary non-detaching seal portion 6E provides the function of limiting the width of the outflow channel to be formed by exfoliation of the lid member 9 below an expected value (agreeing to the width of the triangular seal portion 6T, that is, the length of the auxiliary detaching seal portion 6b).

[Other Embodiments]

<1> It is also possible to embody such that the uneven sealing force groove sunk towards the bottom face 3 at a more acute angle at the radial inner portion than the radial outer portion is applied not only to the reverse-oriented annular seal portion 6A, but also to the auxiliary detaching seal portion 6B or to the entire circumference of the annular seal portion 6. In such case, it is necessary to cause the corresponding portion of the annular projection 31A in the seal head 30 to have the left/right non-symmetric special cross sectional shape whose radial inner portion has a smaller curvature radius than its radial outer portion.

<2> The contents to be held in the portion container is not limited to liquid, but can be e.g. mixture of powder and liquid, mixture of powder and gas, etc.

Figure 10:
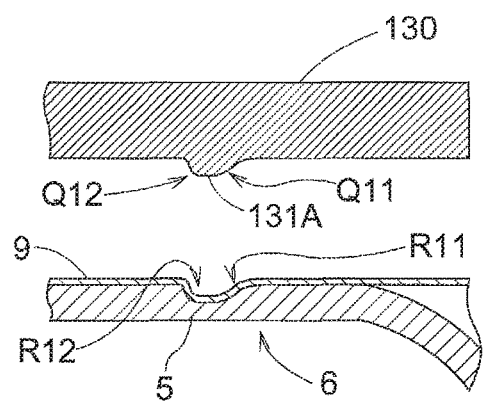
Fig. 10 is a section view showing a detaching seal portion and an annular projection of a seal head in a further embodiment.

<3> As illustrated in FIG. 10, conversely from the above-described embodiment, it is also possible to embody such that in a pressing end portion 131 of a seal head 130, there is formed an uneven projecting portion 131A whose cross sectional contour has a shape of a radial outer portion Q12 having a smaller curvature radius than a radial inner portion Q11. The uneven projecting portion 131A can be provided at a portion in the circumferential direction or to the entirety of the circumferential direction.

When the lid member 9 is sealed with using the seal head 130 described above, needless to say, the portion in the seal groove portion of the annular seal portion 6 formed in the opening by the fusing/bonding which portion corresponds to the uneven projecting portion 131A will be formed as an uneven groove portion having a cross sectional contour having a shape of its radial outer portion R12 having a smaller curvature radius than its radial inner portion R11. As a result, there is obtained a highly functional sealing arrangement that restricts the possibility of inadvertent unsealing due to increase of inside pressure of the container based on an environmental change in the course of transportation or the like, but allows relatively smooth unsealing by a stress for lifting up the lid member from the outer side of the container. Such container can be used not as the type which is unsealed by increase of inside pressure of the container, but as a type of portion container which is unsealed by an exfoliating operation on the lid member from the outer side or a container other than a portion container.

<4> The present invention is applicable not only to a container having a certain depth described in the foregoing embodiment, but also to a container having no depth substantially, such as in the form of a tape. As one conceivable example of such container, there is e.g. a medical treatment tape configured such that inflammation treating agent (an example of "contents") is applied to one face of a tape-like substrate (an example of "container") and to the edge (an example of "opening") of the substrate, a cover film is fused and bonded in such a manner as to cover the inflammation treating agent. When used, a user will exfoliate the cover film, whereby the inflammation treating agent is exposed to become applicable to an affected area.

INDUSTRIAL APPLICABILITY

This invention is applicable as a technique for solving the problems conventionally found in a seal head for fusing and bonding a lid member to an opening of a container body holding contents therein and relates also in a container sealed with using such seal head.

DESCRIPTION OF REFERENCE MARKS/NUMERALS

1: portion container
2: container body
5: flange
5A: flanged face
6: annular seal portion
6A: reverse-oriented annular seal portion (uneven groove)
6S: detaching seal portion
6T: triangular seal portion
9: lid member
30: seal head
31: annular projection (pressing end portion)
31A: annular projection (uneven projecting portion)
31B: annular projection (even projecting portion)
C: contents
P1: leading end
Q1: radial inner portion (uneven projecting portion)
Q11: radial inner portion (uneven projecting portion)
Q2: radial outer portion (uneven projecting portion)
Q12: radial outer portion (uneven projecting portion)
R1: radial inner portion (uneven groove portion)
R11: radial inner portion (uneven groove portion)
R2: radial outer portion (uneven groove portion)
R12: radial outer portion (uneven groove portion)

The invention claimed is:

1. A seal head including, at its leading end, a pressing end portion for pressing a lid member against an opening in order to fuse/bond the lid member to the opening of a container body holding contents therein;
   wherein at least a portion of the pressing end portion is formed as an uneven projecting portion having different curvature radii in its cross sectional contour between a radial inner portion and a radial outer portion of the opening;
   wherein the cross sectional contour of the uneven projecting portion has a shape having a smaller curvature radius on the radial inner side than the radial outer side;
   wherein the pressing end portion constitutes an annular projection endlessly extending along the entire circumference of the opening; and
   the uneven projecting portion is arranged in a reverse-oriented annular projecting portion with a circumferential portion of the annular projection being projected toward the radial inner side.

2. A container including a container body holding contents therein and a lid member fused and bonded to an opening of the container body by a seal head,
   wherein at least a portion of a seal groove portion formed in the opening by the fusing/bonding is provided as an uneven groove portion having different curvature radii in its cross sectional contour between a radial inner side and a radial outer side of the opening;
   wherein the cross sectional contour of the uneven groove portion has a shape whose curvature radius is smaller on the radial inner side than the radial outer side;
   wherein the seal groove portion constitutes an annular seal groove portion endlessly extending along the entire circumference of the opening; and
   the uneven groove portion is arranged in a reverse-oriented annular groove portion with a circumferential portion of the annular groove being projected toward the radial inner side.

* * * * *